(12) United States Patent
Ha et al.

(10) Patent No.: US 11,977,389 B2
(45) Date of Patent: May 7, 2024

(54) LOW-COST AUTONOMOUS DRIVING SHUTTLE AND A METHOD OF OPERATING SAME

(71) Applicants: HYUNDAI MOTOR COMPANY, Seoul (KR); KIA MOTORS CORPORATION, Seoul (KR)

(72) Inventors: Jae Jun Ha, Hwaseong-si (KR); Young Jun Moon, Sejong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 290 days.

(21) Appl. No.: 16/793,645

(22) Filed: Feb. 18, 2020

(65) Prior Publication Data

US 2020/0272163 A1    Aug. 27, 2020

(30) Foreign Application Priority Data

Feb. 21, 2019    (KR) .................... 10-2019-0020768

(51) Int. Cl.
*G05D 1/00*        (2006.01)
*G06F 18/214*    (2023.01)
(Continued)

(52) U.S. Cl.
CPC ......... *G05D 1/0234* (2013.01); *G05D 1/0223* (2013.01); *G05D 1/0246* (2013.01);
(Continued)

(58) Field of Classification Search
CPC ......... G05D 1/0088; G05D 2201/0213; G05D 1/0027; G05D 2201/0212; G05D 1/0289; G05D 1/0221; G05D 1/02; G05D 1/0246; G05D 1/0223; G05D 1/0276; G05D 1/0234; G08G 1/166; G08G 5/04; G08G 5/065; G05B 13/027; G06K 9/00208; G06K 9/00664; G06K 9/00798; G06K 9/00805; G06K 9/6257; B65G 1/0492; B65G 1/1373; B60W 30/14; B60W 40/02; B60W 2050/009; B60W 2420/42; G06V 20/10; G06V 20/58; G06V 20/588; G06V 20/647; G06V 10/82

See application file for complete search history.

(56) References Cited

U.S. PATENT DOCUMENTS 9,786,171 B2 * 10/2017 Prokhorov ............. G08G 1/166
2010/0235032 A1 * 9/2010 Sung .................... G05D 1/0246
701/25

(Continued)

FOREIGN PATENT DOCUMENTS

CN    109283924 A    1/2019
WO    2018125483 A1    7/2018

*Primary Examiner* — Kenneth J Malkowski
*Assistant Examiner* — Ibrahim Abdoalatif Alsomairy
(74) *Attorney, Agent, or Firm* — Lempia Summerfield Katz LLC

(57) ABSTRACT

A method of operating an autonomous driving shuttle includes: receiving, by the autonomous driving shuttle, information on an operation of the autonomous driving shuttle; recognizing a guide line by using at least one camera provided in the autonomous driving shuttle; and driving the autonomous driving shuttle by using the information on the operation and the recognized guide line.

18 Claims, 4 Drawing Sheets

(51) Int. Cl.
  *G06V 10/82* (2022.01)
  *G06V 20/10* (2022.01)
  *G06V 20/56* (2022.01)
  *G06V 20/58* (2022.01)
  *G06V 20/64* (2022.01)

(52) U.S. Cl.
  CPC ........... *G05D 1/0276* (2013.01); *G06V 10/82* (2022.01); *G06V 20/10* (2022.01); *G06V 20/58* (2022.01); *G06V 20/588* (2022.01); *G06V 20/647* (2022.01); *G06F 18/2148* (2023.01)

(56) References Cited

U.S. PATENT DOCUMENTS

| | | | |
|---|---|---|---|
| 2012/0330540 A1* | 12/2012 | Ozaki | G08G 1/096816 701/117 |
| 2015/0179075 A1* | 6/2015 | Lee | G08G 1/165 340/932.2 |
| 2017/0076605 A1* | 3/2017 | Suzuki | G08G 1/133 |
| 2017/0123419 A1* | 5/2017 | Levinson | G01S 7/4972 |
| 2017/0221366 A1 | 8/2017 | An et al. | |
| 2018/0088587 A1* | 3/2018 | Lee | G05D 1/0238 |
| 2018/0188738 A1* | 7/2018 | Tatourian | G05D 1/0274 |
| 2019/0026588 A1* | 1/2019 | Ryan | G05D 1/0088 |
| 2019/0071094 A1* | 3/2019 | Nishiguchi | B60W 30/18163 |
| 2019/0251373 A1* | 8/2019 | Lee | G01C 21/3658 |
| 2019/0265703 A1* | 8/2019 | Hicok | G06Q 10/02 |
| 2019/0286153 A1* | 9/2019 | Rankawat | G06V 20/58 |
| 2020/0166951 A1* | 5/2020 | Choi | H04W 4/44 |
| 2020/0182639 A1* | 6/2020 | Ho | G01C 21/3492 |
| 2020/0202705 A1* | 6/2020 | Sakai | G08G 1/165 |
| 2021/0356289 A1* | 11/2021 | Horihata | G01C 21/365 |

* cited by examiner

LOW-COST AUTONOMOUS DRIVING SHUTTLE AND A METHOD OF OPERATING SAME

CROSS REFERENCE TO RELATED APPLICATION

The present application claims priority to Korean Patent Application No. 10-2019-0020768, filed Feb. 21, 2019, the entire contents of which are incorporated herein for all purposes by this reference.

BACKGROUND OF THE DISCLOSURE

Field of the Disclosure

The present disclosure relates to a low-cost autonomous driving shuttle and a method of operating the same. More particularly, the present disclosure relates to a low-cost autonomous driving shuttle driving along a guide line and a method of operating the low-cost autonomous driving shuttle.

Description of the Related Art

As technology has advanced, interest in autonomous driving of a vehicle has increased. Particularly, many technical advances have been made on how to increase user convenience through autonomous driving of a vehicle and provide an efficient service. However, in order to implement autonomous driving of a vehicle, many highly developed techniques need to be applied to a vehicle, and implementation of an autonomous driving vehicle is costly. Accordingly, the cost of the vehicle increases, and thus the vehicle may not be used. Considering this fact, an autonomous driving shuttle implemented at low cost may be applied, which is described below.

The foregoing is intended merely to aid in the understanding of the background of the present disclosure. The background is not intended to mean that the present disclosure falls within the purview of the related art that is already known to those having ordinary skill in the art.

SUMMARY OF THE DISCLOSURE

Technical Problem

The present disclosure may provide a low-cost autonomous driving shuttle and a method of operating the low-cost autonomous driving shuttle.

The present disclosure may provide a low-cost autonomous driving shuttle that drives along a guide line and a method of operating the low-cost autonomous driving shuttle.

The present disclosure may provide an autonomous driving shuttle and a method in which the autonomous driving shuttle recognizes a guide line and is operated.

The present disclosure may provide an autonomous driving shuttle and a method of reducing a driving error of the autonomous driving shuttle.

Technical Solution

According to an embodiment of the present disclosure, a method of operating an autonomous driving shuttle comprises: receiving, by the autonomous driving shuttle, information on an operation of the autonomous driving shuttle; recognizing a guide line by using at least one camera provided in the autonomous driving shuttle; and driving the autonomous driving shuttle by using the information on the operation and the recognized guide line.

The autonomous driving shuttle may include the at least one camera photographing a driving path. The autonomous driving shuttle may recognize the guide line through the at least one camera photographing the driving path.

The autonomous driving shuttle may include two or more cameras photographing the driving path. The autonomous driving shuttle may acquire a depth image of the guide line through the two or more cameras and recognize the guide line using the acquired depth image.

The autonomous driving shuttle may further include a camera photographing at least one among a forward view, a rear view, and a side view. The autonomous driving shuttle may acquire an image through the camera photographing at least one among the forward view, the rear view, and the side view. The autonomous driving shuttle may drive considering, i.e., taking into account, the acquired image.

The autonomous driving shuttle may transmit information acquired using the at least one camera to a server. The server may store and update the acquired information using machine learning or a learning scheme.

When the autonomous driving shuttle fails to recognize the guide line during driving, the autonomous driving shuttle may transmit a message for requesting path identification to the server. The server may also transmit a path identification message to the autonomous driving shuttle using the information stored and updated through the machine learning or the learning scheme. The autonomous driving shuttle may also drive along the guide line using information received from the server.

The information on the operation may include at least one among start location information, end location information, path information, operation time information, and speed information.

When the autonomous driving shuttle drives along the guide line, the autonomous driving shuttle may acquire an image of an obstacle using the at least one camera.

The autonomous driving shuttle may recognize the obstacle and, when the obstacle is positioned within a preset distance on the guide line, the operation of the autonomous driving shuttle may be stopped.

When the obstacle is a vehicle, the autonomous driving shuttle may identify whether the vehicle is a shuttle on a list.

When the vehicle is the shuttle on the list, the autonomous driving shuttle may determine whether to stop driving, by using a priority of the vehicle.

The autonomous driving shuttle may receive operation-related information from a road side unit (RSU) and may drive along the guide line using the received operation-related information.

According to an embodiment of the present disclosure, an autonomous driving shuttle comprises: a camera unit acquiring an image; and a processor controlling the camera unit. The processor identifies information on an operation of the autonomous driving shuttle and recognizes a guide line using at least one camera included in the camera unit. The autonomous driving shuttle drives using the information on the operation and the recognized guide line.

The autonomous driving shuttle may further comprise a transceiver transmitting and receiving a signal. The information on the operation of the autonomous driving shuttle may be received through the transceiver.

According to an embodiment of the present disclosure, a system for operating an autonomous driving shuttle comprises the autonomous driving shuttle and a server. The autonomous driving shuttle receives information on an operation of the autonomous driving shuttle from the server. The autonomous driving shuttle recognizes a guide line using at least one camera included in the autonomous driving shuttle. The autonomous driving shuttle drives using the information on the operation and the recognized guide line.

Advantageous Effects

According to the present disclosure, the low-cost autonomous driving shuttle can be operated.

According to the present disclosure, the low-cost autonomous driving shuttle can be operated along the guide line.

According to the present disclosure, an autonomous driving shuttle and a method can be provided in which the autonomous driving shuttle recognizes a guide line and is operated.

According to the present disclosure, the driving error of the autonomous driving shuttle can be reduced.

It is to be understood that technical problems to be solved by the present disclosure are not limited to the aforementioned technical problems. Other technical problems, which are not mentioned herein, should be apparent from the following description to a person having ordinary skill in the art to which the present disclosure pertains.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DISCLOSURE

Figure 1:
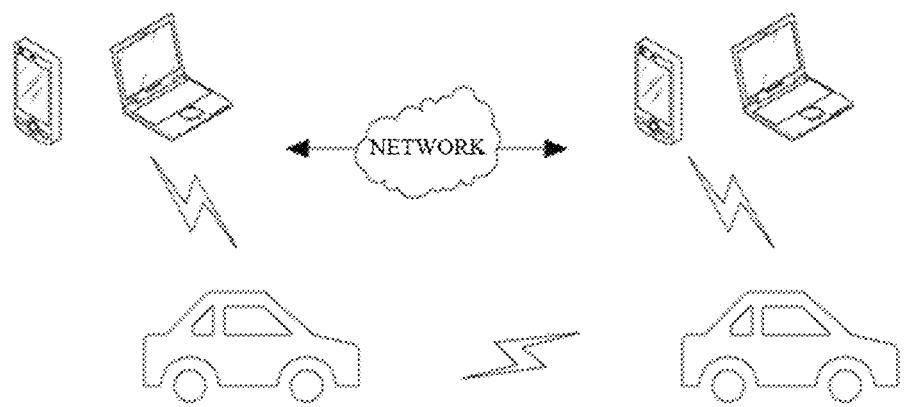
FIG. 1 is a diagram illustrating a method of performing, by a vehicle, communication with devices.

Hereinbelow, embodiments of the present disclosure are described in detail with reference to the accompanying drawings such that the present disclosure can be embodied by those having ordinary skill in the art to which this present disclosure belongs. However, the present disclosure may be embodied in various different forms and should not be limited to the embodiments set forth herein.

In describing the embodiments of the present disclosure, if it was decided that the detailed description of a known function or configuration related to the disclosure makes the subject matter of the disclosure unclear, the detailed description has been omitted. Also, parts that are not related to the description of the present disclosure are omitted in the drawings, and like reference numerals designate like parts therein.

In the present disclosure, when an element is "coupled to", "combined with", or "connected to" another element, it can be directly coupled to the other element or intervening elements may be present therebetween. Also, when a component "comprises" or "includes" an element, unless there is another contrary description, the component does not exclude other elements but may further include the elements.

In the present disclosure, the terms "first", "second", and the like are only used to distinguish one element from another element. Unless specifically stated otherwise, the terms do not denote an order or importance. Thus, without departing from the scope of the present disclosure, a first element of an embodiment could be termed a second element of another embodiment. Similarly, a second element of an embodiment could also be termed a first element of another embodiment.

In the present disclosure, constituent elements that are distinguished from each other to clearly describe each feature do not necessarily denote that the constituent elements are separated. In other words, a plurality of constituent elements may be integrated into one hardware or software unit, or one constituent element may be distributed into a plurality of hardware or software units. Accordingly, even if not mentioned, the integrated or distributed embodiments are included in the scope of the present disclosure.

In the present disclosure, constituent elements described in various embodiments do not denote essential elements, and some of the elements may be optional. Accordingly, an embodiment that includes a subset of constituent elements described in another embodiment is included in the scope of the present disclosure. Also, an embodiment that includes the constituent elements, which are described in the various embodiments, and additional other elements is also included in the scope of the present disclosure.

Advantages and features of the present disclosure, and methods to achieve them should be apparent from the following embodiments that are described in detail with reference to the accompanying drawings. It should be understood that the present disclosure is not limited to the following embodiments and may be embodied in different ways. The embodiments are given to provide complete disclosure of the disclosure and to provide a thorough understanding of the present disclosure to those having ordinary skill in the art.

FIG. 1 is a diagram illustrating a method of performing, by a vehicle, communication with another vehicle or a device over a network. Referring to FIG. 1, the vehicle may perform communication with another vehicle or a device. Herein, for example, the vehicle may perform communication with another vehicle or a device through cellular communication, WAVE communication, or other communication schemes. In other words, the vehicle may be provided with a device capable of performing communication. Based on this, the vehicle may perform communication with another device.

Further, for example, regarding communication of the vehicle, various modules may be separately provided. For example, a module may be provided that is capable of performing communication, i.e., communicating only with a device positioned inside the vehicle for vehicle security. In another example, a module may be provided that is capable of performing communication with an external device away from the vehicle. For example, inside the vehicle, communication, such as Wi-Fi communication, may be performed based on security only for devices within a predetermined range inside the vehicle. For example, the vehicle and a personal electronic device, i.e., a personal device, of the vehicle driver may include respective communication modules for performing only communication therebetween. In other words, the vehicle and the personal device of the vehicle driver may use a communication network that is blocked from an external communication network. Further, for example, the vehicle may include a communication module that performs communication with external devices.

Figure 2A:
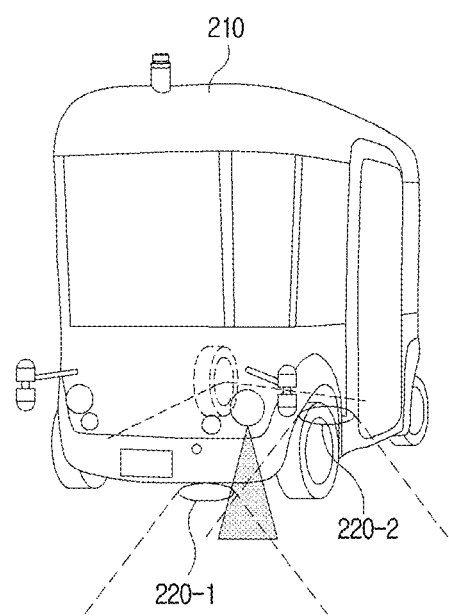
FIGS. 2A and 2B are diagrams illustrating an autonomous driving shuttle.
Figure 2B:
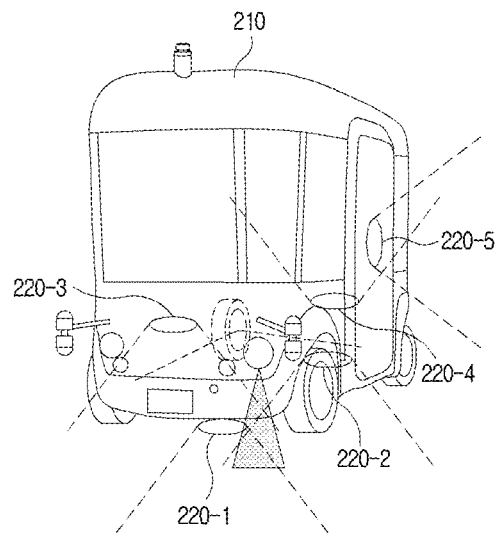

FIGS. 2A and 2B are diagrams illustrating a low-cost autonomous driving shuttle. Referring to FIGS. 2A and 2B, an autonomous driving shuttle 210 may be provided at a relatively low cost. For example, the low-cost autonomous driving shuttle 210 may be a shuttle driving in a predetermined area. Considering the shuttle operation cost, the autonomous driving shuttle 210 may work, i.e., drive or operate, using a guide line on the road and a camera.

Herein, for example, the autonomous driving shuttle 210 may be a shuttle that works or functions based on complete autonomous driving. As another example, the autonomous driving shuttle 210 may be a shuttle in which a partial autonomous driving technique is implemented. More specifically, the shuttle may be a vehicle or a moving object that works or functions based on an autonomous driving function. The degree to which autonomous driving is utilized may vary. For example, the degree of autonomous driving may be indicated by level or grade. The shuttle that works based on complete autonomous driving may be indicated by the highest level or grade. Further, for example, different levels or grades may be indicated according to the degree of autonomous driving. The following description may be applied not only to a complete-autonomous-driving shuttle in which all types of work of the shuttle are controlled, but also to a shuttle performing a partially autonomous driving function. However, in the following description, for convenience of description, an autonomous driving shuttle is referred to, but the present disclosure may be applied to a complete-autonomous-driving shuttle and a partial-autonomous-driving shuttle in the same manner.

Herein, for example, the guide line may be a visually recognized line. For example, the guide line may be a line, such as one formed of a magnetic or fluorescent material, formed visually on the road so that the shuttle is able to recognize the line. As another example, the guide line may be a non-visual line. For example, the guide line may be a line virtually set according to a travel path rather than formed on the road, or the like. In other words, the guide line may refer to a line that is set for the shuttle to recognize, even though the line is not visually distinguished. For example, the guide line may be a virtual line indicated by a road side unit (RSU), which is located in the path along which the shuttle drives, a nearby device, a base station, a server, or the like. In other words, the nearby devices may provide a virtual guide line so that the shuttle can drive on the path. Based on this, the shuttle may work.

As another example, the guide line may be generated based on at least one among a travel path, a traveling direction of the shuttle, and nearby information. In other words, the guide line may be generated in a particular case considering driving of the shuttle and may be set to disappear when the driving is completed.

For example, the guide line may be formed along the path in which the autonomous driving shuttle 210 operates within a predetermined area. For example, the guide line may be formed in such a manner that cameras 220-1, 220-2, 220-3, 220-4, and 220-5 of the autonomous driving shuttle 210 recognize the guide line. In other words, the autonomous driving shuttle 210 may recognize the guide line through the cameras 220-1, 220-2, 220-3, 220-4, and 220-5. Based on this, the shuttle may work. In the meantime, different predetermined areas may be set according to a system design. For example, the predetermined area may be a predetermined area within a university campus or a company. Herein, the predetermined area may be set to a limited range for operating the autonomous driving shuttle at low cost, but no limitation thereto is imposed.

As another example, the shuttle 210 may be a vehicle (or mobile unit) for driving generally rather than within the predetermined region. Herein, the shuttle 210 may refer to a vehicle that drives and is operated on the path based on the guide line or the user's command. The shuttle 210 may not be limited to a particular vehicle or a particular area. For example, the shuttle 210 may be a general vehicle or a large vehicle, such as a bus, or the like. Herein, the shuttle may work or operate based on settings for working as a shuttle. For example, the shuttle 210 may be operated within a university campus, which is the predetermined area as described above. In other words, the shuttle may work or operate based on an area set in a system or the predetermined area in which the shuttle may work. Also, for example, the shuttle may be a vehicle that circulates the center of a city. Also, the predetermined area may not be determined and may be changed according to the user's destination.

Also, for example, the shuttle 210 may be a shuttle controlled by a central server, considering the case of operation within the predetermined area. As another example, the shuttle in a predetermined area which is not determined and varies may be a shuttle that works or operates based on direct communication with a user device without control of the central server. In other words, the shuttle 210 may be an apparatus that is capable of providing a function as a shuttle to the user based on authentication, identification, and security functions by itself. No limitation to the embodiment is imposed.

As another example, the shuttle 210 may work or operate based on a map. For example, the shuttle 210 may use multiple maps, and various types of maps may be used. For example, the multiple maps may include a map related to the operation of the shuttle, or the like, and other maps related to driving. Further, the multiple maps may include maps for a driving area of the shuttle as well as 3D space. No limitation to the embodiment is imposed.

Also, for example, the autonomous driving shuttle 210 may perform communication with the RSU, and based on this, may be controlled. For example, the RSU may be devices that are capable of communicating with the shuttle (or the vehicle) and arranged on the road with a predetermined distance between the devices, i.e., with periodicity. Also, for example, the RSU may be a device that is placed at a particular point on the road and capable of communicating with the shuttle (or the vehicle). As another example, the RSU may refer to a terminal capable of communicating as a traffic infrastructure. As another example, the RSU may refer to a device that is capable of communicating with the shuttle (or the vehicle). Examples of the device include a V2X terminal, a nearby vehicle, a nearby shuttle, and other moving objects. In other words, the RSU refers to a device that is capable of communicating with the autonomous driving shuttle nearby the autonomous driving shuttle. In the following description, for convenience of description, the RSU is referred to. Herein, for example, the autonomous driving shuttle 210 may receive operation-related information from the RSU. Also, the autonomous driving shuttle 210 may receive other types of information from the RSU in addition to the operation-related information. No limitation to the embodiment is imposed. As another example, the autonomous driving shuttle 210 may receive the operation-related information from the RSU at predetermined intervals. Herein, multiple RSUs may transmit operation-related information to the autonomous driving shuttle 210. For example, the operation-related information may be received from an adjacent RSU according to driving of the autonomous driving shuttle 210. Also, for example, the autonomous driving shuttle 210 may receive the operation-related information from the RSU based on triggering. More specifically, the autonomous driving shuttle 210 may receive the operation-related information from the RSU to acquire required information when the user's command or a particular situation is detected. For example, the particular situation may be a case in which the autonomous driving shuttle deviates from the guide line. No limitation to the embodiment is imposed. In other words, the autonomous driving shuttle may receive relevant information from the RSU, and no limitation to the embodiment is imposed.

In the meantime, for example, the autonomous driving shuttle 210 may be provided with the cameras 220-1, 220-2, 220-3, 220-4, and 220-5. Herein, the cameras 220-1, 220-2, 220-3, 220-4, and 220-5 may be devices that are capable of recognizing nearby objects according to the directions in which the cameras are provided. In other words, the autonomous driving shuttle equipped with the cameras may recognize the guide line. For example, the cameras 220-1 and 220-2 may be provided at the bottom of the autonomous driving shuttle 210 as shown in FIG. 2A. For example, multiple cameras 220-1 and 220-2 may be provided, or one camera may be provided. Herein, the guide line may be recognized through the camera. Specifically, the autonomous driving shuttle 210 may continuously recognize the guide line through the camera (or cameras) at the bottom and may drive along the guide line.

Also, for example, when multiple cameras 220-1 and 220-2 are provided, the autonomous driving shuttle 210 acquires a depth image to increase a ratio of guide line recognition. For example, in the case where the autonomous driving shuttle 210 recognizes the guide line through the cameras 220-1 and 220-2, the autonomous driving shuttle 210 may acquire 2D image through the cameras 220-1 and 220-2. Based on this, the shuttle 210 may recognize the guide line. However, in the case where there are obstacles or other objects on the guide line, the autonomous driving shuttle may not accurately recognize the guide line. In other words, the ratio of guide line recognition may decrease. Considering this fact, the autonomous driving shuttle 210 may acquire 3D image information through the multiple cameras 220-1 and 220-2. For example, the autonomous driving shuttle 210 may determine, using the 3D image, whether an obstacle is present on the guide line, whether the image is not clearly recognized due to snow or rain, and so on.

Further, for example, the guide line may be formed based on various paths within the predetermined area. For example, the autonomous driving shuttle 210 may be operated in an area where guide lines are formed as multiple routes. In other words, there may be multiple routes along which the autonomous driving shuttle 210 is operated. For example, guide lines may be set in several directions at the intersection. Also, the guide lines may be set as multiple routes in relation to traveling of the autonomous driving shuttle. In the meantime, for example, regarding to the guide lines, based on the intersection and the number of possible paths, autonomous-driving-shuttle route information may be calculated and stored in the autonomous driving shuttle or a server. Further, the autonomous driving shuttle or the server may recognize the guide line based on the path, which is described further below. In other words, the autonomous driving shuttle may drive along a predetermined path while driving along the guide line and may be operated in the predetermined area.

Further, for example, the camera recognizing the guide line and a processor may be attached and detached from the autonomous driving shuttle as a single device. In other words, as a device for controlling the autonomous driving shuttle that is driving in the predetermined area, the camera and the processor may be a detachable device. Herein, the above-described device is attached to the autonomous driving shuttle to enable the autonomous driving shuttle to drive along the guide line, thereby reducing limitation in operation of the autonomous driving shuttle. More specifically, as described above, the autonomous driving shuttle may include multiple communication modules. Herein, the autonomous driving shuttle may include the multiple communication modules considering the security of the autonomous driving shuttle. For example, in the case where access to the autonomous driving shuttle from the outside is allowed, the risk of an accident may increase and reliable driving may not be secured. Considering this fact, the autonomous driving shuttle may be operated based on the device that is detachable from the autonomous driving shuttle. For example, the device that is detachable from the autonomous driving shuttle may include multiple communication modules. For example, the device that is detachable from the autonomous driving shuttle may include a separate module, which is capable of performing communication only with the autonomous driving shuttle. Herein, the autonomous driving shuttle may communicate with the device that is detachable from the autonomous driving shuttle, through the module. Further, the device that is detachable from the autonomous driving shuttle may perform communication based on an external device, the server, or other modules. In other words, communication with the external device or the server may be performed through the detachable device. The authority to control the autonomous driving shuttle or the authority to access the autonomous driving shuttle may not be allowed from the outside, thereby enhancing security efficiency.

In the meantime, for example, the autonomous driving shuttle may further include multiple cameras. More specifically, the autonomous driving shuttle may include the cameras 220-1 and 220-2 provided at the bottom of the autonomous driving shuttle as shown in FIG. 2A. Further, referring to FIG. 2B, the autonomous driving shuttle may further include cameras 220-1, 220-2, 220-3, 220-4, and 220-5 located at least one among the front, the rear, and the side of the autonomous driving shuttle. Herein, for example, the cameras 220-1 and 220-2 at the bottom recognize the guide line so that the autonomous driving shuttle drives along the guide line. However, when driving occurs by recognizing the guide line through the cameras 220-1 and 220-2, the autonomous driving shuttle may not correctly work due to an error in recognizing the guide line. Considering this fact, the autonomous driving shuttle 210 may further include the cameras 220-3, 220-4, and 220-5. Herein, the cameras 220-3, 220-4, and 220-5 may identify a forward-view image or a rear-view image to check whether the autonomous driving shuttle 210 is correctly operated. Also, the cameras 220-3, 220-4, and 220-5 may identify a side-view image to check whether the autonomous driving shuttle 210 is correctly operated. As a specific example, in the case where the autonomous driving shuttle 210 is operated along the guide line in the predetermined area, the image recognized by the forward-view camera 220-3 may be repeated. In other words, the forward-view image is limited only to an image that changes according to the path. Information on the images and image changes may be stored.

Also, for example, the image recognized by the autonomous driving shuttle from at least one among the above-described cameras 220-1, 220-2, 220-3, 220-4, and 220-5 may be an image of the driving path of the autonomous driving shuttle. Further, for example, the autonomous driving shuttle 210 may recognize the predetermined area adjacent to the autonomous driving shuttle 210 through the cameras 220-1, 220-2, 220-3, 220-4, and 220-5. For example, nearby areas that may be recognized by the autonomous driving shuttle 210 may vary according to a setting. For example, the autonomous driving shuttle 210 may set the nearby area to be small to increase the accuracy of guide line recognition. For example, when the weather is cloudy or it is difficult to recognize the guide line, the area to be recognized may be small. As another example, when the ratio of guide line recognition is high or it is easy to recognize the guide line, a range of recognition by the autonomous driving shuttle 210 is wide. In other words, the autonomous driving shuttle 210 may recognize the nearby area or the driving path through at least one among the cameras 220-1, 220-2, 220-3, 220-4, and 220-5. No limitation to the embodiment is imposed.

As another example, the autonomous driving shuttle may recognize an obstacle through the above-described camera. Herein, in the case where the obstacle recognized by the autonomous driving shuttle is positioned on the guide line and where the obstacle is positioned within a preset distance from the autonomous driving shuttle, the autonomous driving shuttle may stop driving. Herein, for example, the autonomous driving shuttle may stop the operation. Further, for example, the autonomous driving shuttle may send notification of the obstacle to a personal device or a server, which may be used to effect removal of the obstacle.

Figure 3:
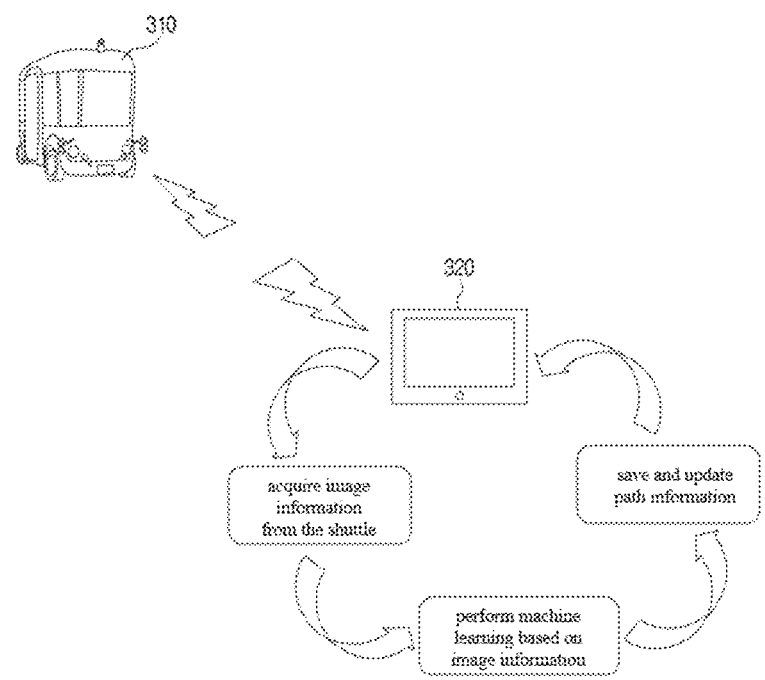
FIG. 3 is a diagram illustrating driving path information of an autonomous driving shuttle.

Also, for example, referring to FIG. 3, the autonomous driving shuttle 310 may continuously update information on the forward-view image through machine learning. Further, for example, the autonomous driving shuttle 310 may periodically transmit forward-view images to a server 320. The server 320 may analyze the information on the forward-view images through machine learning for continuous updates. Based on the above description, when the autonomous driving shuttle 310 drives along the guide line, it is checked whether the autonomous driving shuttle deviates. In other words, even though the autonomous driving shuttle 310 does not clearly recognize the guide line through the cameras at the bottom, the autonomous driving shuttle 310 compares a pre-stored forward-view image and the current image to determine whether the shuttle (vehicle) is correctly operated, thereby increasing driving reliability.

Specifically, referring to FIG. 3, the autonomous driving shuttle 310 may periodically transmit image information acquired through the cameras to the server. Herein, the server 320 may perform machine learning based on images periodically acquired and may store the image information based on the autonomous driving shuttle path. Herein, in the case of the autonomous driving shuttle, an area where driving is possible as a predetermined area is limited. The number of images to be acquired and analyzed may be limited, and thus data processing may be sufficiently possible. In other words, the amount of data that needs to be processed may be reduced.

As another example, the autonomous driving shuttle 310 may recognize the guide line through the cameras at the bottom and may drive. Herein, an error in recognizing the guide line may occur in the autonomous driving shuttle 310. For example, the error in recognizing the guide line may be a case where the guide line cannot be identified through the cameras at a predetermined ratio or more. For example, in the case of snow or rain or in the case where the guide line cannot be recognized due to an obstacle below the shuttle may be considered. Herein, when the ratio of guide line recognition is equal to or less than a predetermined value, the autonomous driving shuttle 310 determines the error in recognizing the guide line. When the autonomous driving shuttle 310 determines the error in recognizing the guide line, the autonomous driving shuttle 310 makes a request to the server for information for identifying the path. Herein, the server 320 may provide the information for identifying the path to the autonomous driving shuttle 310 by using information that is acquired through machine learning based on the image information periodically acquired from the autonomous driving shuttle 310 and other types of information. For example, as described above, since the autonomous driving shuttle 310 drives along the predetermined path, the image information recognized by the autonomous driving shuttle 310 may be repeated. Based on this, the path may be identified. The autonomous driving shuttle 310 may then drive along the guide line based on the image information acquired from the server 320. Herein, the autonomous driving shuttle 310 may continuously recognize the guide line using the cameras at the bottom. When the ratio of guide line recognition is equal to or greater than a predetermined ratio, the autonomous driving shuttle 310 drives along the guide line again. Also, the autonomous driving shuttle 310 may then periodically transmit the acquired image information to the server.

In the meantime, for example, when the autonomous driving shuttle 310 does not correctly recognize the path through the above description, the autonomous driving shuttle 310 stops the operation and transmits an error message to the server 320. No limitation to the embodiment is imposed. Through the above description, having the cameras attached, the autonomous driving shuttle 310 may be operated within the predetermined area, thereby operating the low-cost autonomous driving shuttle.

As another example, a method of increasing the ratio of guide line recognition may be considered. For example, the ratio of guide line recognition may be increased using a lamp or a light emitting part of the autonomous driving shuttle. More specifically, since the guide line is located below the autonomous driving shuttle, light may be blocked, and thus the ratio of guide line recognition may decrease. To compensate for this, the lamp or the light emitting part for illuminating the guide line may be present. As another example, the shuttle may further include a display unit, and may further check whether the shuttle travels along the guide line, through a map application. For example, the shuttle may display the map application. Herein, information on the guide line may be shared in advance. Further, the guide line may be set in a complicated manner or may be set to various paths.

Next, a detailed method of driving the autonomous driving shuttle may be considered. For example, the autonomous driving shuttle may receive information for driving from the personal device or the server, and based on this, may work.

More specifically, before starting driving, the autonomous driving shuttle may receive at least one among start location information, end location information, path information, operation time information, and speed information. Also, the autonomous driving shuttle may acquire, in advance, other types of information required for driving. No limitation to the embodiment is imposed. Herein, the start location information, the end location information, and the path information may be set based on the above-described guide line. For example, the personal device or the server may store information on the guide line in advance based on the predetermined area. Herein, the personal device or the server may determine the start location and the end location based on the information, which is stored in advance, on the guide line. Based on this, the personal device or the server may set the path for the guide line. Herein, for example, the autonomous driving shuttle may further have operation time information or operation speed information set. Further, the path information of the autonomous driving shuttle may be set, further considering the operation time information or the operation speed information. No limitation to the embodiment is imposed.

However, for example, as described above, since the autonomous driving shuttle drives along the guide line, driving while considering guide line recognition may be required. For example, considering this fact, when the autonomous driving shuttle is operated, work at the intersection is set. Herein, for example, the work at the intersection may be controlled through communication with the RSU, which is described below.

Figure 4:
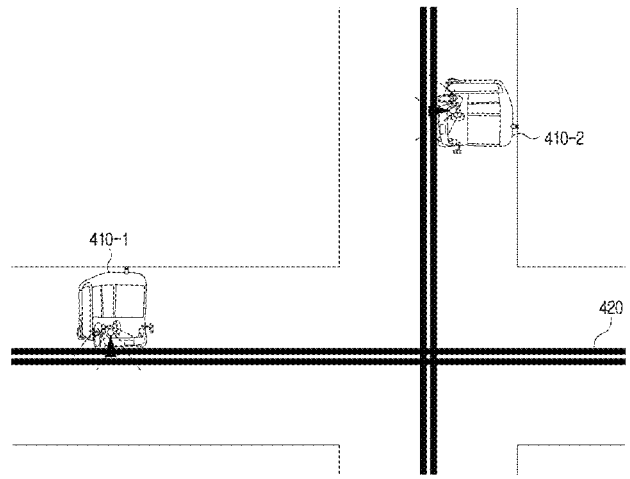
FIG. 4 is a diagram illustrating a method in which an autonomous driving shuttle drives along a guide line.

Herein, for example, referring to FIG. 4, in the work of the autonomous driving shuttle at the intersection, whether another vehicle or another shuttle is present at the intersection may be identified through the forward-view camera. When the autonomous driving shuttle 410-1 determines that another vehicle 410-2 or another shuttle 410-2 is not present, the autonomous driving shuttle 410-1 continues driving at the intersection. Conversely, when the autonomous driving shuttle 410-1 detects that another vehicle 410-2 or another shuttle 410-2 is present at the intersection by using the camera, the autonomous driving shuttle 410-1 transmits a signal to the vehicle 410-2 or the shuttle 410-2. For example, the autonomous driving shuttle 410-1 may transmit a signal, such as ultrasonic waves or the like, for detecting an object. Through this, the autonomous driving shuttle 410-1 may detect a distance to the vehicle 410-2 or the shuttle 410-2. The autonomous driving shuttle 410-1 may then determine, based on information on the guide line 420, a risk of collision with the vehicle 410-2 or the shuttle 410-2 at the intersection. For example, the autonomous driving shuttle 410-1 continues driving, when a sufficient distance is secured or achieved, and it is determined that there is no risk of collision. Conversely, the autonomous driving shuttle 410-1 stops driving when the distance is determined not to be sufficient and it is determined that there is a risk of collision. The autonomous driving shuttle 410-1 may then exchange signals with the vehicle 410-2 or the shuttle 410-2. Herein, the autonomous driving shuttle 410-1 may identify the priority by exchanging signals with the vehicle 410-2 or the shuttle 410-2 and may drive according to the priority. In other words, based on the signal exchange, when it is determined that the autonomous driving shuttle 410-1 has a highest priority, the autonomous driving shuttle 410-1 continues driving. Conversely, when it is determined that the autonomous driving shuttle 410-1 has a priority lower than that of the vehicle 410-2 or the shuttle 410-2, the autonomous driving shuttle stops driving until the vehicle 410-2 or the shuttle 410-2 completes driving.

As a more specific example, multiple shuttles may detect each other at the intersection. For example, each of the shuttles may detect other shuttles through a camera or a signal, and when there is no risk of collision, driving is performed. Conversely, each of the shuttles may stop driving based on the risk of collision. For example, the multiple shuttles may detect the risk of collision at the intersection and all of the multiple shuttles may stop driving. In the above situation, the multiple shuttles may exchange signals with each other and may determine the priorities. For example, each of the shuttles may determine its priority based on the sequence of exchanged signals. In other words, the shuttle that stops first may transmit a signal first, and the shuttle that stops first may have the highest priority. Herein, each shuttle may identify its priority by identifying how many signals have been transmitted before the shuttle transmits a signal and how many signals have been received before the shuttle receives a signal. Based on this, the shuttle may drive. As another example, the shuttle may recognize another vehicle at the intersection based on the RSU, which is described below.

As another example, the autonomous driving shuttle may distinguish a shuttle or a normal vehicle through the camera and then may work, i.e., drive or operate. For example, the autonomous driving shuttle may store information on another shuttle driving within the same region. For example, the autonomous driving shuttle may acquire image information of another shuttle through the camera and may match the acquired image information with the stored information to recognize the shuttle. For example, when the autonomous driving shuttle does not recognize the shuttle as a matched shuttle, the autonomous driving shuttle recognizes the shuttle as a normal vehicle. Herein, the autonomous driving shuttle may always give priority to the normal vehicle. More specifically, in a relationship between the autonomous driving shuttle and another shuttle that is matched with information pre-stored in the autonomous driving shuttle, the priority is set based on relevant information, and driving may be controlled. However, the autonomous driving shuttle cannot store all types of information on a normal vehicle, and there may be a limit in recognizing information through the camera. Considering this fact, when the autonomous driving shuttle recognizes the normal vehicle through the camera, the autonomous driving shuttle gives priority to the normal vehicle. In other words, the autonomous driving shuttle stops driving when the autonomous driving shuttle recognizes the normal vehicle at the intersection, and the autonomous driving shuttle waits for driving of the normal vehicle. Through this, the autonomous driving shuttle may reduce the likelihood of an accident and an error caused by an unrecognized vehicle.

On the other hand, when the autonomous driving shuttle recognizes the matched shuttle through the camera, the RSU, or communication with the server, the autonomous driving shuttle drives based on information with the matched shuttle. Further, for example, the autonomous driving shuttle may recognize the matched shuttle through communication with the RSU or with the server. In other words, as described above, the present disclosure may be applied to the case of recognition through the camera, the case of recognition through the RSU, or the case of recognition through communication with the server in the same manner. However, for convenience of description, the following description is given based for the case of recognition through the camera.

For example, the autonomous driving shuttle may store shuttle list information. Herein, a shuttle list may have priorities of respective shuttles that are set or stored. In other words, when the autonomous driving shuttle recognizes another shuttle at the intersection, the autonomous driving shuttle stops driving for a while to secure driving of the shuttle having a higher priority. Conversely, when the priority of the autonomous driving shuttle is higher than that of the shuttle recognized by the autonomous driving shuttle, the autonomous driving shuttle does not stop driving and passes through the intersection. In other words, based on the preset priorities, the autonomous driving shuttle may drive, and thus collision at the intersection may be prevented. Herein, for example, the preset priorities may be set by the server or the system. For example, the preset priorities may vary according to the degree of charging. For example, when a user of an autonomous driving shuttle uses a high-priced autonomous driving shuttle, its priority is higher than those of other shuttles and fast driving at the intersection is guaranteed. Conversely, when the user of an autonomous driving shuttle uses a low-priced autonomous driving shuttle, its priority is lower than those of other shuttles and based on this, the driving time is longer. In other words, the system or the server may control the priority of the autonomous driving shuttle. Based on this, the operation of the autonomous driving shuttle may be controlled. As another example, the priorities may be set by another method, and no limitation to the embodiment is imposed.

As another example, when the autonomous driving shuttle recognizes the matched shuttle rather than the normal vehicle, the autonomous driving shuttle performs communication with other shuttles. For example, communication between autonomous driving shuttles may be performed based on a preset method. Further, for example, for security and accident prevention, it may be set that communication is possible only between autonomous driving shuttles. No limitation to the embodiment is imposed. For example, in the case of a normal vehicle, it may be unclear whether communication with the autonomous driving shuttle is possible. Therefore, communication between autonomous driving shuttles may be performed only when the matched shuttle is recognized. Herein, the autonomous driving shuttle may determine priorities at the intersection through communication with the matched shuttle. In other words, the autonomous driving shuttle may determine the shuttle of which driving at the intersection is guaranteed, through the communication. For example, as described above, driving of the shuttle that transmits a signal first may be guaranteed. No limitation to the embodiment is imposed.

Further, for example, when the autonomous driving shuttle drives along the guide line, the autonomous driving shuttle periodically performs communication with the server or the personal device to reduce the driving error.

Figure 5:
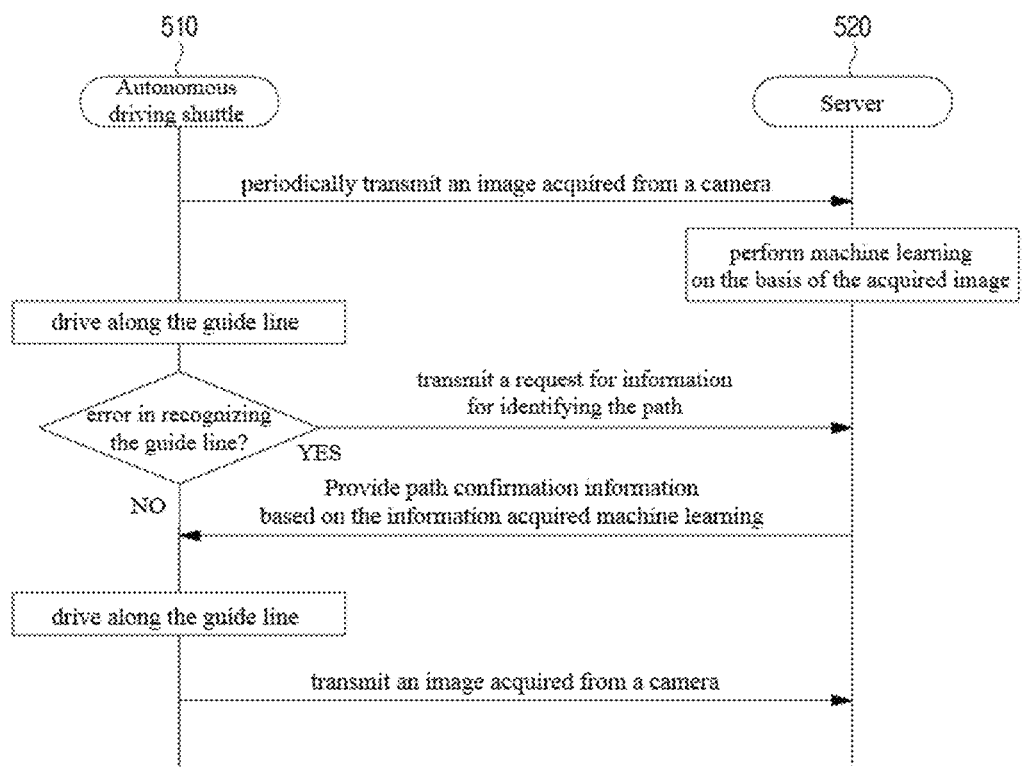
FIG. 5 is a diagram illustrating a method in which an autonomous driving shuttle drives along a guide line based on a server.

For example, referring to FIG. 5, the autonomous driving shuttle 510 may drive along the guide line, based on the above description. Herein, the autonomous driving shuttle may transmit an image acquired from a vehicle camera, to a server 520 (or a personal device). Herein, the image acquired from the camera may be at least one among an image of the guide line, a forward-view image, a rear-view image, and a side-view image. No limitation to the embodiment is imposed. The server 520 may then perform machine learning based on the acquired image. For example, the server 520 may periodically update the images acquired based on the synthetic neural network, may learn the repeated images, and may store and update the image information. The autonomous driving shuttle 510 may then determine whether there is an error in recognizing the guide line. In other words, when there is no error in recognizing the guide line, the autonomous driving shuttle 510 continues driving along the guide line. Conversely, when the autonomous driving shuttle 510 fails to recognize the guide line, the autonomous driving shuttle 510 transmits information on the error to the server 520. In other words, the autonomous driving shuttle 510 may transmit a request to the server 520 for information for identifying the path. Herein, the server 520 may identify driving path information of the autonomous driving shuttle 510 based on information that is periodically acquired from the autonomous driving shuttle 510 and is already subjected to machine learning. In other words, the server 520 may identify an error occurrence point of the autonomous driving shuttle 510 and information on the future path, through learning about an image or a video changing according to the guide line. Herein, the server 520 may provide the information for identifying the path to the vehicle. Through this, the autonomous driving shuttle 510 may continuously drive along the guide line. Further, the autonomous driving shuttle 510 may then periodically transmit relevant information to the server 520. Based on this, the autonomous driving shuttle 510 continuously drives even when the error in recognizing the guide line occurs.

Based on the above description, the autonomous driving shuttle may continue driving within the predetermined region or along the guide line within the area and may be operated at low cost.

As another example, in order to increase the accuracy of the driving, global positioning system (GPS) information may be used. More specifically, the vehicle may be equipped with a GPS device, and the vehicle may acquire location information based on the GPS. Herein, even though the vehicle drives along the guide line based on the image acquired through the camera, additional location information is acquired to check whether the vehicle deviates from the path. For example, as described above, when the ratio of guide line recognition is equal to or greater than a predetermined value and there is no obstacle, the shuttle drives along the guide line. Conversely, when the ratio of guide line recognition is equal to or less than the predetermined value or when the accuracy of the path is low, for example, when there is an obstacle, the GPS device is used to increase the accuracy of location. In other words, fundamentally, the shuttle travels along the guide line recognized through the camera, and additional location information is used to secure reliability of traveling.

As another example, the autonomous driving shuttle may work or operate by performing communication with the RSU. Considering this fact, the shuttle may be equipped with a device capable of performing communication with the RSU. For example, the shuttle may be equipped with a module for communication and may communicate with nearby RSUs through the communication module. However, when the shuttle continuously communicates with the RSUs, there is a limit in driving, such as power consumption. Therefore, fundamentally, the shuttle may travel along the guide line through the camera at the bottom of the shuttle. Herein, as described above, the shuttle may determine whether to communicate with the nearby RSUs, based on an image of at least one among a forward view, a rear view, and a side view. For example, when it is determined that an obstacle is located within a reference distance, based on the acquired images of the forward view, the rear view, and/or the side view, the shuttle communicates with the RSU to avoid the obstacle. In other words, the shuttle may operate as usual for normal work, and only when the obstacle is recognized through the camera, the shuttle communicates with the nearby RSUs. Herein, the nearby RSUs may communicates with devices installed nearby and other devices, based on an infrastructure. In the meantime, communication performed in the present disclosure may be based on various methods, and no limitation to the embodiment is imposed. Herein, when the RSU receives a request about an obstacle from the shuttle, the RSU identifies information on the obstacle. For example, the RSU may identify location information of the obstacle through communication with other devices. Based on this, the RSU may provide feedback information to the shuttle. Herein, the shuttle may stop driving based on the received information. Afterward, based on a signal acquired from the RSU or the image information that the shuttle directly acquires, when it is determined that the obstacle disappears, the shuttle drives again.

Further, for example, as described above, in the case where the autonomous driving shuttle drives along the guide line, there may be an intersection. For example, when the autonomous driving shuttle recognizes an obstacle, the autonomous driving shuttle communicates with the RSU and receives accurate information on the obstacle from the RSU and work information based on this. Through this, even when the intersection is present, the autonomous driving shuttle acquires information on another shuttle or vehicle. In other words, based on the RSU present at the intersection, the operation of the autonomous driving shuttle may be controlled.

Further, for example, in the case of operating the shuttle, the driving may be controlled. For example, a start location, an end location, an operation speed, an operation location of the shuttle, and other types of information related to operation may need to be controlled.

Herein, although the operation of the shuttle may be performed along the guide line through recognition by the camera, the driving of the shuttle may be controlled through communication with the RSU. For example, referring to FIG. 6, in terms of driving, the controlling is performed through the camera, and in terms of being operated, the controlling is performed through communication. For example, the RSUs may be installed at a start location, an end location, and a stop point of the shuttle. For example, there may be an RSU pre-installed with a bus stop and the shuttle may communicate with the RSUs.

Figure 6:
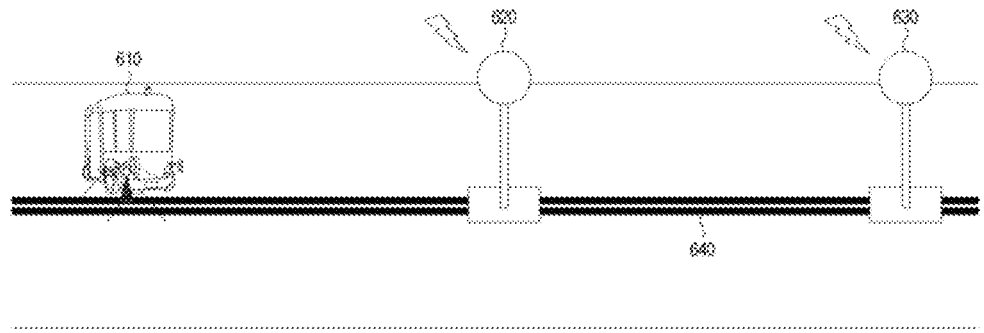
FIG. 6 is a diagram illustrating a method in which an autonomous driving shuttle communicates with a road side unit (RSU)

Specifically, referring to FIG. 6, the shuttle 610 may receive information on the operation from the RSUs 620 and 630, at the start location. Herein, the information on the operation may include at least one among stop location (e.g. bus stop) information, operation estimated-time information, and operation region information. In other words, the shuttle 610 may receive operation-related information at the start location. The shuttle 610 may then start the operation through the RSU at the start location. Herein, the shuttle 610 may turn on the camera and may recognize the guide line 640 to perform the operation. In the meantime, the shuttle 610 may receive a stop signal from the RSUs 620 and 630, at the stop location (e.g. bus stop) and may temporarily stop the operation. For example, the shuttle 610 may receive information from the RSUs 620 and 630 at the stop location. Also, for example, the shuttle 610 may determine the time to temporarily stop, considering the operation-related information received from the start location, operation time information at the stop location, and the like. Also, for example, the shuttle 610 may adjust the speed of the shuttle from the current stop location to the next stop location based on the information received from the start location. In other words, the information received from the start location may include information on an estimated time for each stop point, information on the operation working based on the time, and the like. Herein, the shuttle 610 is operated using the guide line 640 recognized through the camera. Control of the specific speed and the operation may be performed through communication with the RSUs 620 and 630. In other words, for working at low cost, the vehicle may be equipped with only the camera and the communication module, driving control may be performed through the camera, and operation control may be performed through the communication module. Also, for example, the shuttle 610 may transmit operation information to the server for management. Based on this, an accident during the operation may be prevented.

Further, for example, considering this situation, the shuttle 610 may receive information in advance on the driving path from the server of the RSU, at the start location. Herein, the information on the driving path may be included in the map application as a path where the guide line is formed. Herein, the shuttle may acquire the location information through a GPS. Based on this, the location may be displayed in the map application. For example, the shuttle may travel by recognizing the guide line and may identify the travel path through the map application. Further, whether the shuttle drives along the guide line in the correct direction may be further checked. In other words, the vehicle may use the map application and the location information in parallel with recognition of the guide line, thereby further securing reliability of driving.

Figure 7:
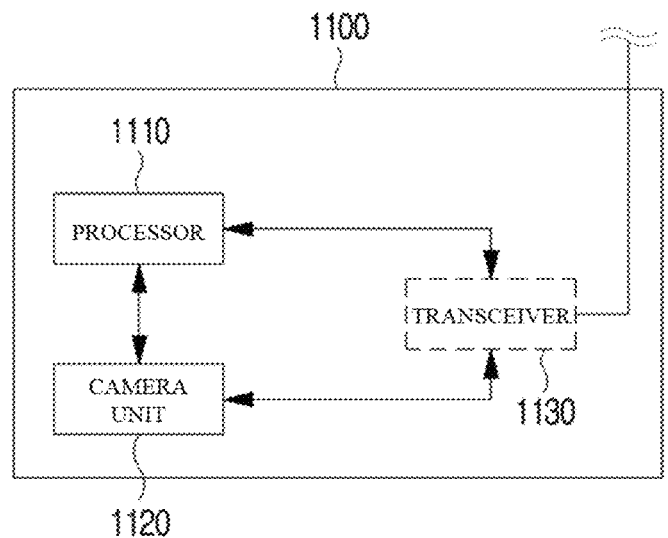
FIG. 7 is a block diagram illustrating an autonomous driving shuttle.

FIG. 7 is a diagram illustrating an autonomous driving shuttle. Referring to FIG. 7, an autonomous driving shuttle 1100 may include a processor 1110 and a camera unit 1120. Herein, the processor 1110 may be an entity for controlling an autonomous driving vehicle as described above. For example, the processor 1110 may be a hardware configuration. As another example, the processor 1110 may be a software configuration for controlling the autonomous driving shuttle. No limitation to the embodiment is imposed. Also, for example, the autonomous driving shuttle 1100 may include a camera unit 1120. Herein, the camera unit 1120 may include at least one camera as described above. For example, the camera unit 1120 may acquire an image of the guide line below the vehicle. Also, for example, the camera unit 1120 may further include a camera acquiring an image of at least one among a forward view, a rear view, and a side view, which is as described above.

Also, for example, the autonomous driving shuttle 1100 may further include a transceiver 1130. For example, the processor 1110 of the autonomous driving shuttle 1100 may perform communication with other devices through the transceiver 1130, which is as described above.

Although the methods in the present disclosure are expressed as a series of operations for clarity of description, the order of the steps is not limited thereto. When necessary, the steps may be performed simultaneously or in a different order. In order to realize the method according to the present disclosure, other steps may be added to the illustrative steps, some steps may be excluded from the illustrative steps, or some steps may be excluded while additional steps may be included.

The various embodiments of the present disclosure are not intended to list all possible combinations, but to illustrate representative aspects of the present disclosure. The matters described in the various embodiments may be applied independently or in a combination of two or more.

Further, the various embodiments of the present disclosure may be implemented by hardware, firmware, software, or combinations thereof. In the case of implementation by hardware, implementation is possible by one or more application specific integrated circuits (ASICs), digital signal processors (DSPs), digital signal processing devices (DSPDs), programmable logic devices (PLDs), field programmable gate arrays (FPGAs), general processors, controllers, micro controllers, microprocessors, and the like.

The scope of the present disclosure includes software or machine-executable instructions (for example, an operating system, an application, firmware, a program, and the like) that cause operation according to the methods of the various embodiments to be performed on a device or a computer. The scope of the present disclosure also includes a non-transitory computer-readable medium storing such software or instructions to execute on a device or a computer.

Although an embodiment of the present disclosure has been described for illustrative purposes, those having ordinary skill in the art will appreciate that various modifications, additions, and substitutions are possible, without departing from the scope and spirit of the disclosure as disclosed in the accompanying claims.

What is claimed is:

1. A method of operating an autonomous driving shuttle, the method comprising:
   receiving, by the autonomous driving shuttle, information on an operation of the autonomous driving shuttle from a server;
   using at least one camera provided in the autonomous driving shuttle for recognizing a guide line; and
   driving the autonomous driving shuttle by using the information on the operation and the guide line in response to recognition of the guide line by the recognizing the guide line,
   wherein the autonomous driving shuttle transmits a message for requesting path identification to the server, in response to the autonomous driving shuttle failing to recognize the guide line during driving,
   wherein the server generates image information for an error occurrence point using machine learning or a learning scheme, determines information for identifying the path of the error occurrence point using the image information stored and updated, and transmits a path information message including the information for identifying the path of the error occurrence point to the autonomous driving shuttle,
   wherein the autonomous driving shuttle drives along the guide line using the information for identifying the path of the error occurrence point in the path information message received from the server,
   wherein the autonomous driving shuttle determines a time to temporarily stop at a stop location, considering operation-related information received from a start location and operation time information at the stop location,
   wherein, in response to the autonomous driving shuttle recognizing a vehicle as an obstacle, the autonomous driving shuttle identifies whether the vehicle is a shuttle on a shuttle list, and
   wherein, in response to the vehicle not being the shuttle on the shuttle list, the autonomous driving shuttle stops the driving until the driving of the vehicle is completed.

2. The method of claim 1, wherein the autonomous driving shuttle includes the at least one camera photographing a driving path, and wherein the autonomous driving shuttle recognizes the guide line through the at least one camera photographing the driving path.

3. The method of claim 2, wherein the autonomous driving shuttle includes two or more cameras photographing the driving path, and wherein the autonomous driving shuttle acquires a depth image of the guide line through the two or more cameras and recognizes the guide line using the acquired depth image.

4. The method of claim 2, wherein the autonomous driving shuttle further includes a camera photographing at least one among a forward view, a rear view, and a side view, and acquires an image through the camera photographing at least one among the forward view, the rear view, and the side view, and wherein the autonomous driving shuttle drives considering the acquired image.

5. The method of claim 1, wherein the information on the operation includes at least one among start location information, end location information, path information, operation time information, and speed information.

6. The method of claim 1, wherein the information on the operation is received from a server or a personal device.

7. The method of claim 1, wherein, in response to the autonomous driving shuttle driving along the guide line, the autonomous driving shuttle acquires an image of an obstacle using the at least one camera.

8. The method of claim 7, wherein, in response to the autonomous driving shuttle recognizing the obstacle and the obstacle is positioned within a preset distance on the guide line, the operation of the autonomous driving shuttle is stopped.

9. The method of claim 1, wherein, in response to the vehicle being the shuttle on the shuttle list, the autonomous driving shuttle determines whether to stop driving, by using a priority of the vehicle.

10. The method of claim 9, wherein the list includes priority information for each shuttle included in the shuttle list, and
    wherein the autonomous driving shuttle determines whether to stop the driving by comparing the priority of the autonomous driving shuttle and the priority of the vehicle.

11. The method of claim 1, wherein the guide line is set in a predetermined area, and the autonomous driving shuttle drives only in the predetermined area.

12. The method of claim 1, wherein the autonomous driving shuttle receives operation-related information from a road side unit (RSU) and drives along the guide line using the received operation-related information.

13. The method of claim 12, wherein, in response to the autonomous driving shuttle driving along the guide line, the autonomous driving shuttle periodically receives driving related information from the RSU.

14. An autonomous driving shuttle comprising:
    a camera unit configured to acquire an image; and
    a processor configured to control the camera unit,
    wherein the processor receives information on an operation of the autonomous driving shuttle from a server, and attempts to recognize a guide line using at least one camera included in the camera unit, and
    the autonomous driving shuttle is configured to drive using the information on the operation and the attempt to recognize the guide line,
    wherein the processor of the autonomous driving shuttle transmits a message for requesting path identification to the server, in response to the autonomous driving shuttle failing to recognize the guide line during driving,
    wherein the server generates image information for an error occurrence point using machine learning or a learning scheme, determines information for identifying the path of the error occurrence point using the image information stored and updated, and transmits a path identification message including the information for identifying the path of the error occurrence point to the autonomous driving shuttle, wherein the autonomous driving shuttle drives along the guide line using the information for identifying the path in the path information message of the error occurrence point received from the server, wherein the processor of the autonomous driving shuttle adjusts a speed of the autonomous driving shuttle from a current stop location to a next stop location based on information received from a start location, wherein, in response to the autonomous driving shuttle recognizing a vehicle as an obstacle, the processor of the autonomous driving shuttle identifies whether the vehicle is a shuttle on a shuttle list, and wherein, in response to the vehicle not being the shuttle on the shuttle list, the processor of the autonomous driving shuttle stops the driving until the driving of the vehicle is completed.

15. The autonomous driving shuttle of claim 14, further comprising:

a transceiver configured to transmit and receive a signal, wherein the information on the operation of the autonomous driving shuttle is received through the transceiver.

16. A system for operating an autonomous driving shuttle, the system comprising:

an autonomous driving shuttle; and a server, wherein the autonomous driving shuttle is configured to receive information on an operation of the autonomous driving shuttle from the server, wherein the autonomous driving shuttle is configured to attempt to recognize a guide line using at least one camera included in the autonomous driving shuttle, wherein the autonomous driving shuttle is configured to drive using the information on the operation and the attempt to recognize the guide line, wherein the autonomous driving shuttle transmits a message for requesting path identification to the server, in response to the autonomous driving shuttle failing to recognize the guide line during driving, wherein the server generates image information for an error occurrence point using machine learning or a learning scheme, determines information for identifying the path of the error occurrence point using the image information stored and updated, and transmits a path identification message including the information for identifying the path of the error occurrence point to the autonomous driving shuttle, wherein the autonomous driving shuttle drives along the guide line using the information for identifying the path in the path information message of the error occurrence point received from the server, wherein the autonomous driving shuttle determines a time to temporarily stop at a stop location, considering operation-related information received from a start location and operation time information at the stop location, wherein, in response to the autonomous driving shuttle recognizing a vehicle as an obstacle, the autonomous driving shuttle identifies whether the vehicle is a shuttle on a shuttle list, and wherein, in response to the vehicle not being the shuttle on the shuttle list, the autonomous driving shuttle stops the driving until the driving of the vehicle is completed.

17. The method of claim 1, wherein the recognizing the guide line comprises the guide line being a virtual line virtually set according to a travel path.

18. The method of claim 17, wherein the autonomous driving shuttle generates the virtual line for a predetermined particular driving situation of the autonomous driving shuttle and controls the virtual line to disappear in response to the predetermined particular driving situation being ended.

* * * * *